(12) United States Patent
Yamamura

(10) Patent No.: US 10,999,450 B2
(45) Date of Patent: May 4, 2021

(54) IMAGE INSPECTION APPARATUS AND IMAGE FORMING APPARATUS USING READING RESULT OF INCIDENT LIGHT REFLECTED FROM TARGET BOTH VIA AND NOT VIA LIGHT GUIDE MEMBER

(71) Applicant: Konica Minolta Inc., Tokyo (JP)

(72) Inventor: Akira Yamamura, Toyokawa (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 16/892,878

(22) Filed: Jun. 4, 2020

(65) Prior Publication Data

US 2020/0389559 A1 Dec. 10, 2020

(30) Foreign Application Priority Data

Jun. 10, 2019 (JP) .............................. JP2019-107614

(51) Int. Cl.
| | |
|---|---|
| *H04N 1/00* | (2006.01) |
| *H04N 1/23* | (2006.01) |
| *H04N 1/12* | (2006.01) |
| *H04N 1/193* | (2006.01) |

(52) U.S. Cl.
CPC ..... *H04N 1/00034* (2013.01); *H04N 1/00015* (2013.01); *H04N 1/00037* (2013.01); *H04N 1/00082* (2013.01); *H04N 1/1295* (2013.01); *H04N 1/1937* (2013.01); *H04N 1/2323* (2013.01)

(58) Field of Classification Search
CPC ........... H04N 1/02835; H04N 1/02855; H04N 1/1295; H04N 1/1936; H04N 1/00015; H04N 1/00034; H04N 1/00068; H04N 1/00082; H04N 1/00092; H04N 1/2323; H04N 1/407; H04N 1/6027; H04N 1/6097

See application file for complete search history.

(56) References Cited

U.S. PATENT DOCUMENTS

| | | | | |
|---|---|---|---|---|
| 7,621,615 | B2 * | 11/2009 | Kikuchi | ................. B41J 11/009 347/105 |
| 7,821,639 | B2 * | 10/2010 | Ehbets | ............... H04N 1/00058 356/402 |

(Continued)

FOREIGN PATENT DOCUMENTS

JP        2012-247280 A      12/2012

*Primary Examiner* — Scott A Rogers
(74) *Attorney, Agent, or Firm* — Lucas & Mercanti, LLP

(57) ABSTRACT

An image inspection apparatus includes: an illumination part that emits light on an inspection target; a reading part that is arranged with, in one or more dimensions, elements that detect light reflected by the inspection target, the reading part reading an entire width of the inspection target; and a hardware processor that inspects a characteristic of the inspection target, wherein a light guide member is provided at a position where light regularly reflected by the inspection target passes, the light guide member is arranged to allow an optical path of light incident on the reading part via the light guide member to be parallel to an optical path of light incident on the reading part without via the light guide member, and the hardware processor inspects a gloss distribution of the inspection target, and inspects a density distribution of the inspection target.

11 Claims, 11 Drawing Sheets

(56) References Cited

U.S. PATENT DOCUMENTS

| | | | |
|---|---|---|---|
| 8,680,993 B2* | 3/2014 | Xu | G01N 21/57 340/540 |
| 9,160,868 B2* | 10/2015 | Umemoto | H04N 1/401 |
| 2014/0129179 A1* | 5/2014 | Xu | G01N 21/57 702/189 |
| 2019/0235435 A1* | 8/2019 | Yamamura | G03G 15/5029 |

* cited by examiner

IMAGE INSPECTION APPARATUS AND IMAGE FORMING APPARATUS USING READING RESULT OF INCIDENT LIGHT REFLECTED FROM TARGET BOTH VIA AND NOT VIA LIGHT GUIDE MEMBER

The entire disclosure of Japanese patent Application No. 2019-107614, filed on Jun. 10, 2019, is incorporated herein by reference in its entirety.

BACKGROUND

Technological Field

The present invention relates to an image inspection apparatus and an image forming apparatus, and more particularly, to an image inspection apparatus for inspecting a characteristic of a sheet, and an image forming apparatus including the image inspection apparatus.

Description of the Related Art

In an image forming apparatus such as a multi-functional peripheral (MFP) that prints image information on a sheet by using an electrophotographic process, image quality greatly varies with environmental changes such as temperature and humidity, temporal changes of materials and parts, and the like, even when trying to maintain certain image quality. Therefore, image information is inspected by a sensor or the like that measures a density, and an inspection result is fed back to an image process. In recent years, there has been widespread use of image forming apparatuses that can read a sheet printed with image information by an image inspection apparatus and feed back the read density, color, and position information to an image process, in order to further improve the quality of images.

Regarding such an image inspection apparatus, for example, JP 2012-247280 A discloses an image inspection apparatus for inspecting a density distribution and a gloss distribution of an image on an object to be inspected that are acquired based on a light amount of diffuse reflection light and a light amount of regular reflection light received by an optical reading part. The image inspection apparatus includes: a density distribution inspection illumination part that emits density distribution inspection illumination light on an object to be inspected on which an image is formed; a gloss distribution inspection illumination part that emits gloss distribution inspection illumination light on the object to be inspected; and the optical reading part that receives diffuse reflection light and regular reflection light reflected from the object to be inspected. The density distribution inspection illumination part emits the density distribution inspection illumination light that is visible light, the gloss distribution illumination part emits the gloss distribution inspection illumination light that is invisible light, and the optical reading part includes: a first optical reading part that simultaneously lights the density distribution inspection illumination part and the gloss distribution illumination part and exclusively receives the diffuse reflection light of visible light diffused and reflected by an image forming material after being transmitted inside an image on the object to be inspected, to output a density distribution based on an amount of the diffuse reflection light; and a second optical reading part that exclusively receives the regular reflection light of invisible light that is regularly reflected from a surface of an image on the object to be inspected, to output a gloss distribution based on an amount of regular reflection light.

Even with an image forming apparatus that can read a sheet printed with image information with an image inspection apparatus and compare the read image information with original image information to inspect a printing state, simply reading a density may not enable proper maintenance of image quality. For example, when printing a background and a target in a same color system, the target appears to be floating even if the density is controlled, because there is a difference in gloss between the background and the target even in similar colors. Further, even in printing that gives gloss by decorating, it is not possible to properly express a difference between glossy silver and matte silver even by controlling the density.

To solve this problem, as disclosed in JP 2012-247280 A, a method of controlling the gloss by detecting an amount of regular reflection light has been proposed. However, it is necessary to read regular reflection light reflected in the entire area in order to inspect the entire area of a sheet to be printed by the image forming apparatus, and it is necessary to dispose a sensor at a distant in order to read the regular reflection light, causing a problem that the image inspection apparatus becomes too large to be mounted to the image forming apparatus.

SUMMARY

The present invention has been made in view of the above problems, and a main object of the present invention is to provide an image inspection apparatus that can be mounted to an image forming apparatus, and can measure a gloss distribution over the entire surface of a sheet, and an image forming apparatus.

To achieve the abovementioned object, according to an aspect of the present invention, an image inspection apparatus reflecting one aspect of the present invention comprises: an illumination part that emits light on an inspection target; a reading part that is arranged with, in one or more dimensions, elements that detect light reflected by the inspection target, the reading part reading an entire width of the inspection target; and a hardware processor that inspects a characteristic of the inspection target based on a reading result of the reading part, wherein a light guide member is provided at a position where light regularly reflected by the inspection target passes, the light guide member is arranged to allow an optical path of light incident on the reading part via the light guide member to be parallel to an optical path of light incident on the reading part without via the light guide member, and the hardware processor inspects a gloss distribution of the inspection target based on a reading result of light incident on the reading part via the light guide member, and inspects a density distribution of the inspection target based on a reading result of light incident on the reading part without via the light guide member.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

DETAILED DESCRIPTION OF EMBODIMENTS

Figure 1:
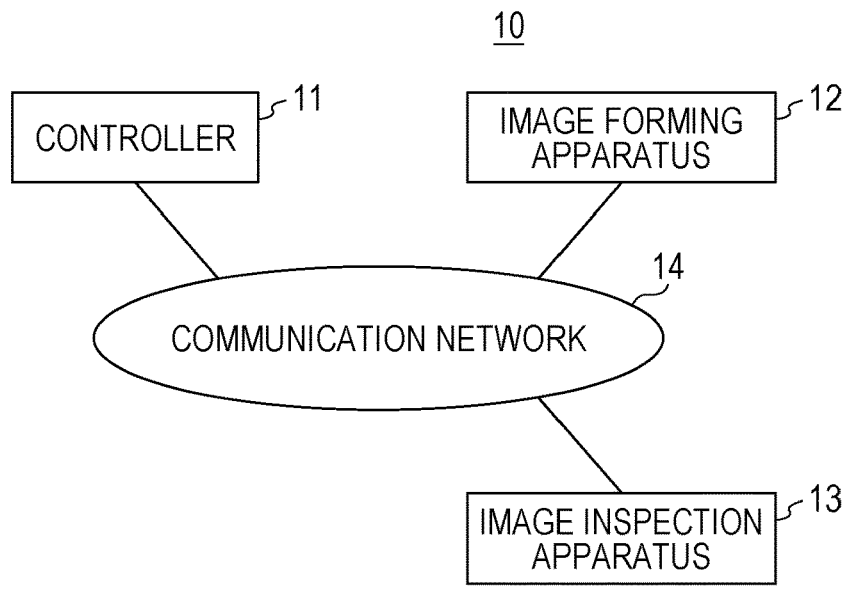
FIG. 1 is a diagram illustrating an example of a configuration of a printing system according to one embodiment of the present invention.

Hereinafter, one or more embodiments of the present invention will be described with reference to the drawings. However, the scope of the invention is not limited to the disclosed embodiments.

As described in Description of the Related art, in an image forming apparatus that uses an electrophotographic process to print image information on a sheet, image quality greatly varies due to environmental changes such as temperature and humidity and temporal changes of materials and components. For this reason, image information is inspected by a sensor or the like that measures a density, and an inspection result is fed back to an image process, and image forming apparatuses having an image inspection apparatus have become widespread in recent years.

However, even in an image forming apparatus provided with such an image inspection apparatus, it is not possible to properly maintain image quality by simply reading the density. For example, due to a difference in gloss between a background and a target even for similar colors, the target appears to be floating even when the density is controlled, and it is not possible to appropriately express a difference between glossy silver and matte silver even when controlling the density. To solve this problem, a method of controlling the gloss by detecting an amount of regular reflection light has been proposed. However, it is necessary to read regular reflection light reflected in the entire area in order to inspect the entire area of a sheet, and it is necessary to dispose a sensor at a distant in order to read the regular reflection light, causing a problem that the image inspection apparatus becomes too large to be mounted to the image forming apparatus.

Therefore, in an embodiment of the present invention, regular reflection light from a sheet is returned in a direction other than a main scanning direction of the sheet (desirably, in a normal direction of the sheet or a sub scanning direction of the sheet) by using a light guide member such as a mirror. Specifically, in an image inspection apparatus including: an illumination part that emits light on an inspection target; a reading part that is arranged with, in one or more dimensions, elements that detect light reflected by the inspection target, and reads an entire width of the inspection target; and a control part that inspects a characteristic of the inspection target based on a reading result of the reading part, a light guide member is provided at a position where light regularly reflected by the inspection target passes, the light guide member is arranged to allow an optical path of light incident on the reading part via the light guide member to be parallel to an optical path of light incident on the reading part without via the light guide member, and the control part inspects a gloss distribution of the inspection target based on a reading result of light incident on the reading part via the light guide member, and inspects a density distribution of the inspection target based on a reading result of light incident on the reading part without via the light guide member.

In this way, by returning the regular reflection light from the sheet in a direction other than the main scanning direction of the sheet by using the light guide member such as a mirror, the image inspection apparatus can be downsized and mounted to the image forming apparatus. Then, using the image forming apparatus mounted with the image inspection apparatus enables appropriate feedback of an image inspection result to an image process, to maintain favorable image quality.

EXAMPLE

Figure 2:
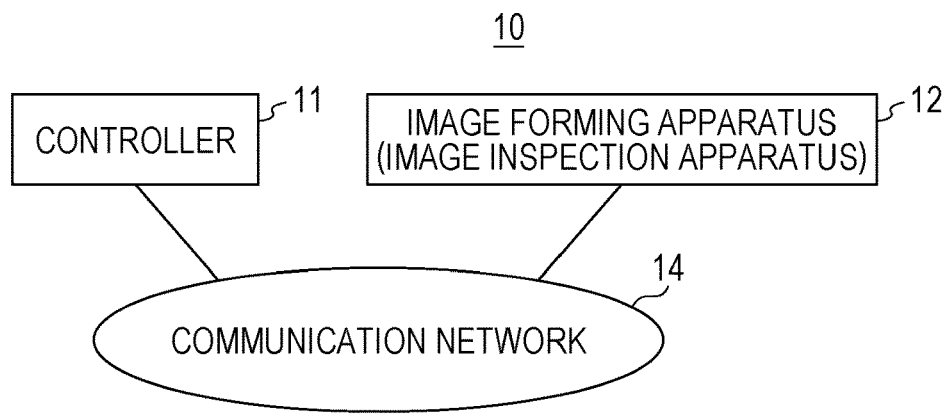
FIG. 2 is a diagram illustrating another example of the configuration of the printing system according to one embodiment of the present invention.
Figure 3:
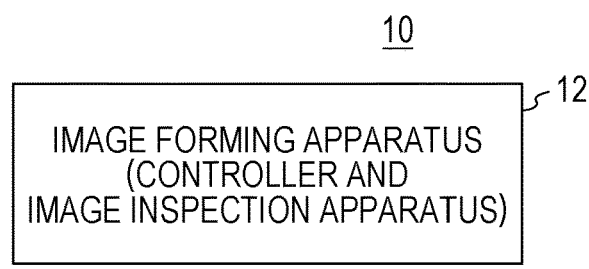
FIG. 3 is a diagram illustrating another example of the configuration of the printing system according to one embodiment of the present invention.
Figure 4A:
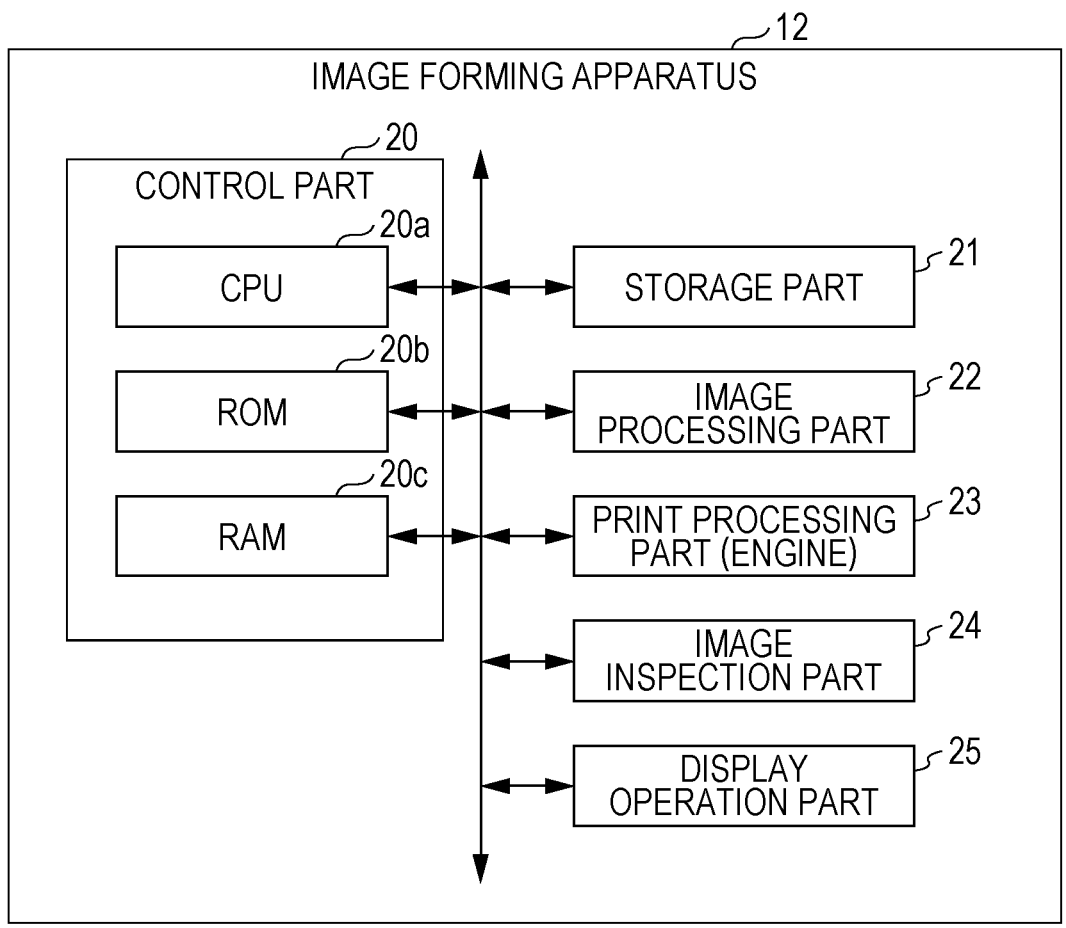
FIGS. 4A and 4B are block diagrams illustrating a configuration of an image forming apparatus according to one embodiment of the present invention.
Figure 4B:
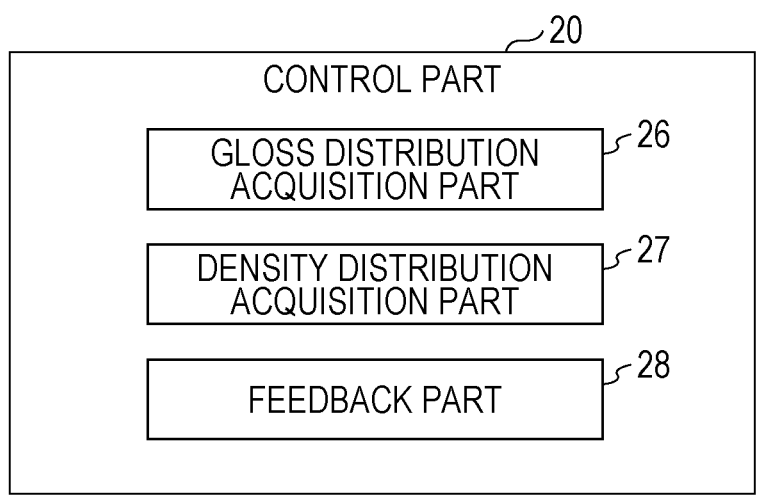
Figure 5:
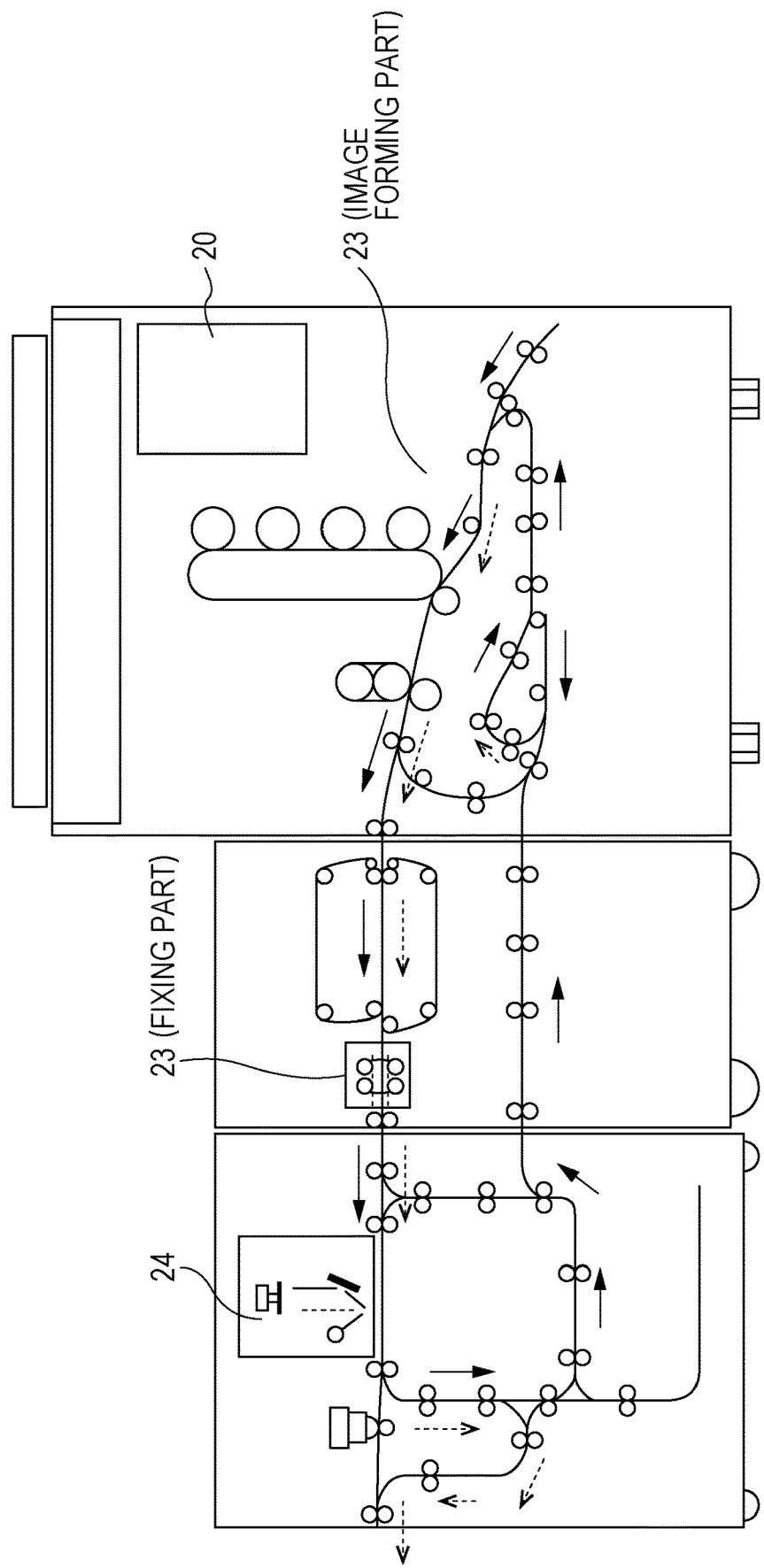
FIG. 5 is a schematic view illustrating an example of a structure of the image forming apparatus according to one embodiment of the present invention.
Figure 6:
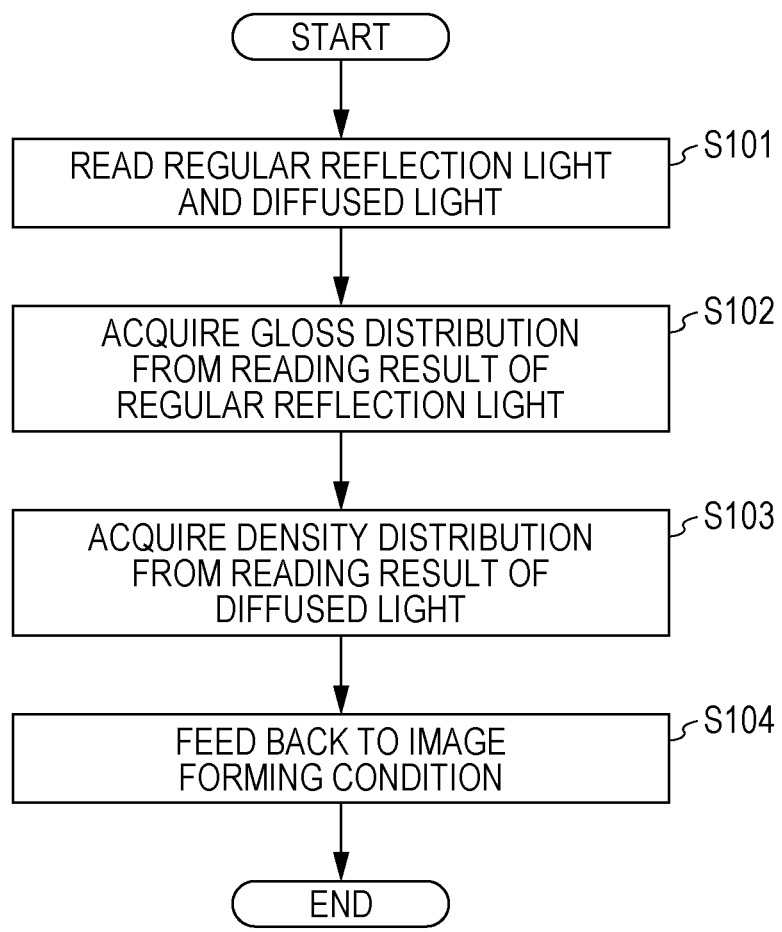
FIG. 6 is a flowchart illustrating an operation of the image forming apparatus according to one embodiment of the present invention.

In order to explain the one embodiment of the present invention described above in more detail, an image inspection apparatus and an image forming apparatus according to an embodiment of the present invention will be described with reference to FIGS. 1 to 16. FIGS. 1 to 3 are schematic diagrams illustrating a configuration of a printing system according to the present embodiment, FIGS. 4A and 4B are block diagrams illustrating a configuration of the image forming apparatus according to the present embodiment, and FIG. 5 is a schematic view illustrating an example of a structure of the image forming apparatus according to the present embodiment. FIG. 6 is a flowchart illustrating an operation of the image forming apparatus according to the present embodiment, and FIGS. 7 to 16 are schematic views illustrating a structure of an image inspection part in the image forming apparatus according to the present embodiment.

As illustrated in FIG. 1, a printing system 10 of the present embodiment includes a controller 11 that performs raster image processing (RIP) processing on a print job inputted from a computer device (not illustrated) or the like, an image forming apparatus 12 that forms an image on a sheet based on image data after the RIP processing, an image inspection apparatus 13 that inspects the sheet formed with the image, and the like. These are connected to be able to perform data communication via a communication network 14 such as a local area network (LAN) defined by a standard such as Ethernet (registered trademark), token ring, and fiber-distributed data (FDDI), or a wide area network (WAN).

Note that, in FIG. 1, the printing system 10 is formed by the controller 11, the image forming apparatus 12, and the image inspection apparatus 13, but the printing system 10 can also be formed by the controller 11 and the image forming apparatus 12 as illustrated in FIG. 2, when the image inspection apparatus 13 is mounted to the image forming apparatus 12. Further, when providing the image forming apparatus 12 with a function as the controller 11, as illustrated in FIG. 3, the printing system 10 may be formed by the image forming apparatus 12 alone. Hereinafter, for facilitating explanation, the description will be made assuming the configuration of FIG. 3.

As illustrated in FIG. 4A, the image forming apparatus 12 in the configuration of FIG. 3 includes a control part 20, a storage part 21, an image processing part 22, a print processing part (engine) 23, an image inspection part 24, a display operation part 25, and the like.

The control part 20 includes a central processing unit (CPU) 20a and memories such as a read only memory (ROM) 20b and a random access memory (RAM) 20c, which are connected via a bus. The CPU 20a performs overall control of the image forming apparatus 12 by reading out a control program from the ROM 20b and the storage part 21, developing the control program into the RAM 20c, and executing the control program.

The storage part 21 is formed by a hard disk drive (HDD), a solid state drive (SSD), and the like, and stores a program for the CPU 20a to control each part, a print job received from an external computer device and the like, image data generated from the print job, image information (a gloss distribution and a density distribution) read by the image inspection part 24, image forming conditions, and the like.

The image processing part 22 translates a print job described in page description language (PDL) such as printer control language (PCL) or post script (PS) to generate intermediate data, uses a color conversion table to perform color conversion on the intermediate data, and performs rendering to generate image data of a print image (this series of processing is called RIP processing). Further, the image processing part 22 performs image processing such as color adjustment, density adjustment, size adjustment, and screening (halftone dot processing) on the print image after the RIP processing.

The print processing part 23 is an engine that executes print processing based on a print image. Specifically, the print processing part 23 includes an exposure part that emits a laser beam to expose based on a print image, a photoreceptor drum, a developing device, a charging device, a photoreceptor cleaning part, and a primary transfer roller, and formed by: an image forming part that forms a toner image of each color of yellow (Y), magenta (M), cyan (C), and black (K); an intermediate transfer belt that is rotated by a roller and functions as an intermediate transfer body that conveys the toner image formed by the image forming part to a sheet; a secondary transfer roller that transfers the toner image formed on the intermediate transfer belt to a sheet; a fixing part that fixes the toner image transferred to the sheet; a sheet feeding part such as a sheet feeding tray; a sheet discharging part such as a sheet discharging tray; and a conveyance part such as a sheet feeding roller, a resist roller, a loop roller, a reversing roller, and a sheet discharging roller, for conveyance of a sheet.

Further, the print processing part 23 can select between a single-sided printing mode for printing on one side alone of the sheet and a double-sided printing mode for printing on both sides of the sheet. In a case of the double-sided printing mode, as shown by a solid line arrow in FIG. 5, a sheet is conveyed from the sheet feeding part, a print image is formed on a front side of the sheet by the print processing part 23 (image forming part), the print image is fixed by the print processing part 23 (fixing part), and the image inspection part 24 reads image information on the front side of the sheet. Thereafter, the sheet is conveyed by the resist roller and the loop roller, turned over by the reversing roller, and conveyed again to the image forming part. Then, as shown by a dashed arrow in FIG. 5, a print image is formed on a back side of the sheet by the image forming part, the print image is fixed by the fixing part, and the image inspection part 24 reads image information of the back side of the sheet. Alternatively, after formation of print images on both sides of the sheet, image information on both sides of the sheet is read by using the image inspection parts 24 arranged on both sides of the sheet.

The image inspection part 24 reads image information of an inspection target (sheet). The image inspection part 24 includes an illumination part, a light guide member, a reading part, and, if necessary, a reflecting member, a light-transmitting member, a position maintaining member, and the like. The image inspection part 24 is provided to, for example, a sheet conveyance path between the fixing part of the print processing part 23 and the sheet discharging tray. Note that the detailed configuration of the image inspection part 24 will be described later.

The display operation part 25 is a touch panel or the like in which a touch sensor formed by a grid-shaped transparent electrode is formed on a display part such as a liquid crystal display (LCD) or an organic electro luminescence (EL)

display, and displays various screens related to image formation and enables various operations related to image formation on the screen.

As illustrated in FIG. 4B, the control part 20 of the image forming apparatus 12 also functions as a gloss distribution acquisition part 26, a density distribution acquisition part 27, a feedback part 28, and the like, and inspects a characteristic of the inspection target.

The gloss distribution acquisition part 26 acquires a gloss distribution of the inspection target, based on a reading result of regular reflection light reflected by the entire width of the inspection target by the reading part of the image inspection part 24.

The density distribution acquisition part 27 acquires a density distribution of the inspection target, based on a reading result of diffused light reflected by the entire width of the inspection target by the reading part of the image inspection part 24.

The feedback part 28 adjusts image forming conditions of the image forming part based on the gloss distribution acquired by the gloss distribution acquisition part 26 and the density distribution acquired by the density distribution acquisition part 27. For example, if a charging voltage (minus voltage) of the photoreceptor drum deviates from a desired value, the density distribution varies. Therefore, the image forming conditions are adjusted such that the charging voltage is lowered (increased) in a portion where the density is low (high). Further, if a fixing temperature is high, a toner is crushed well and the gloss increases. Therefore, the image forming conditions are adjusted such that the fixing temperature is increased (decreased) in a portion where the gloss is low (high).

The gloss distribution acquisition part 26, the density distribution acquisition part 27, and the feedback part 28 may be formed as hardware. Alternatively, the control part 20 may be adapted as an image inspection program for functioning as the gloss distribution acquisition part 26, the density distribution acquisition part 27, and the feedback part 28, and the CPU 20a may execute the image inspection program.

Note that FIGS. 4A and 4B are examples of the image forming apparatus 12 of the present embodiment, and the configuration thereof can be changed as appropriate. For example, in FIGS. 4A and 4B, the image forming apparatus 12 having the function of the image inspection apparatus 13 has been described. However, when functioning as the image inspection apparatus 13 alone, it is possible to omit the image processing part 22, the print processing part 23, and the like from the configuration in FIGS. 4A and 4B, and the control part of the image inspection apparatus 13 may function as the gloss distribution acquisition part 26, the density distribution acquisition part 27, and the feedback part 28 (the CPU of the control part executes the image inspection program).

Hereinafter, an image inspection method using the image forming apparatus 12 having the configuration illustrated in FIGS. 4A and 4B will be described. The CPU 20a executes processing of each step illustrated in the flowchart of FIG. 6, by developing the image inspection program stored in the ROM 20b or the storage part 21 into the RAM 20c and executing the image inspection program.

First, the image inspection part 24 reads regular reflection light that is regularly reflected on a sheet, and diffused light that is diffused on the sheet (S101). In a case of forming an image on both sides of the sheet, a back side of the sheet can be inspected by reversing the sheet and forming an image again on the back side of the sheet after inspection of a front side of the sheet, or both sides of the sheet can be inspected using the image inspection parts 24 arranged on both sides of the sheet, after formation of an image on both sides of the sheet.

Next, the control part 20 (the gloss distribution acquisition part 26) acquires a gloss distribution of the inspection target, based on a reading result of regular reflection light reflected by the entire width of the inspection target by the reading part of the image inspection part 24 (S102).

Next, the control part 20 (the density distribution acquisition part 27) acquires a density distribution of the inspection target, based on a reading result of diffused light reflected by the entire width of the inspection target by the reading part of the image inspection part 24 (S103).

Then, the control part 20 (the feedback part 28) adjusts image forming conditions of the image forming part based on the gloss distribution acquired by the gloss distribution acquisition part 26 and the density distribution acquired by the density distribution acquisition part 27 (S104).

Hereinafter, a specific structure of the image inspection part 24 of the present embodiment will be described with reference to schematic views of FIGS. 7 to 16. In FIGS. 7 to 16, a structure (a conveyance roller or the like) for conveyance of a sheet as the inspection target 30 is omitted. Further, the inspection target 30 is conveyed from left to right in the figure, and a depth direction in the figure is a main scanning direction (width direction), and a left-right direction in the figure is a sub scanning direction (conveyance direction).

Figure 7:
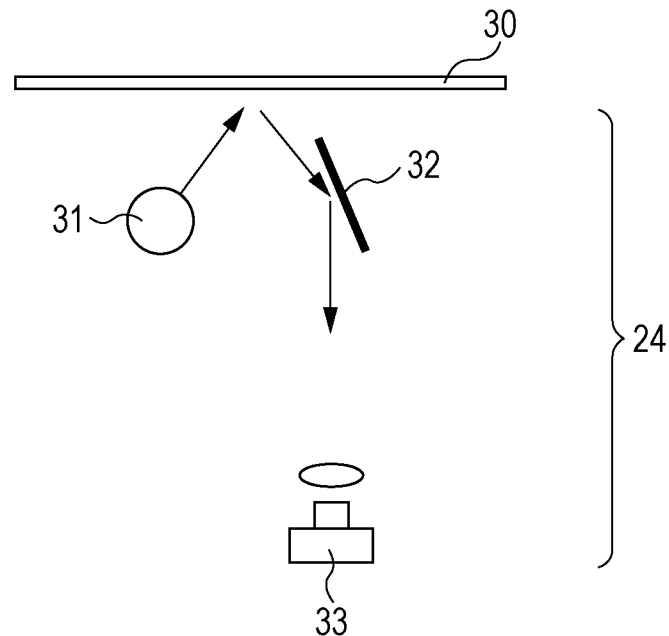
FIG. 7 is a schematic view illustrating an example of a structure of an image inspection part in the image forming apparatus according to one embodiment of the present invention (when a gloss distribution alone is read)

FIG. 7 shows a basic structure of the image inspection part 24 of the present embodiment. The image inspection part 24 includes at least: an illumination part 31 that emits light on the inspection target 30 such as a sheet; a light guide member 32 that guides light regularly reflected on the inspection target 30 in a direction other than the main scanning direction (width direction) of the inspection target 30 (in a normal direction or the sub scanning direction); and a reading part 33 that is arranged with, in one or more dimensions, elements that detect light reflected by the inspection target 30, and reads an entire width of the inspection target 30.

The illumination part 31 is formed by a light emitting diode (LED), a laser oscillator, or the like, and emits light such as visible light or infrared light at a predetermined angle over the entire width of the inspection target 30. Note that, in the present embodiment, in order to detect at least regular reflection light, the light emitted from the illumination part 31 desirably has a certain degree of directivity.

The light guide member 32 is a mirror, an optical fiber, or the like, and is disposed at a position where light regularly reflected by the inspection target 30 passes. By returning the regular reflection light in a direction other than the main scanning direction with the light guide member 32, the image inspection part 24 can be downsized.

The reading part 33 is, for example, a linear sensor in which a sensor such as a charge coupled device (CCD) or a complementary metal oxide semiconductor (CMOS) is arranged in one dimension (in the main scanning direction, that is, in the depth direction in the drawing), or an array sensor in which the sensor is arranged in two dimensions (the main scanning direction and the sub scanning direction). The reading part 33 outputs a signal corresponding to an amount of light reflected by the sheet. In FIG. 7, the gloss distribution of the inspection target 30 can be acquired by reading the regular reflection light that is incident via the light guide member 32.

Figure 8:
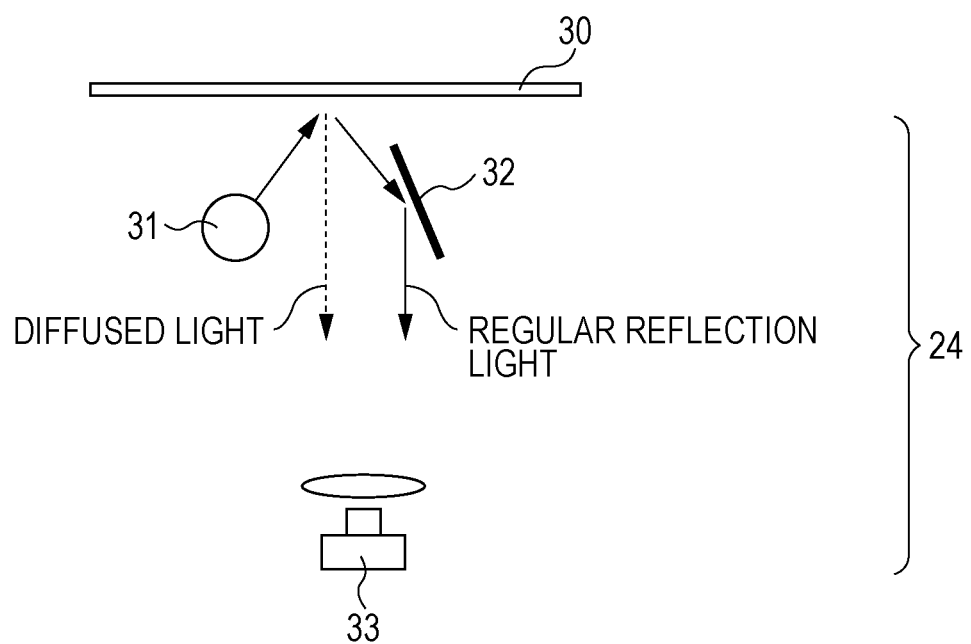
FIG. 8 is a schematic view illustrating another example of the structure of the image inspection part in the image forming apparatus according to one embodiment of the present invention (when a gloss distribution and a density distribution are read by one reading part)

In FIG. 7, the light regularly reflected by the inspection target 30 is exclusively read. However, as illustrated in FIG. 8, in addition to acquiring the gloss distribution of the inspection target 30 by reading the light regularly reflected by the inspection target 30, the density distribution of the inspection target may be acquired by reading light diffused by the inspection target 30. In this case, the light guide member 32 is arranged such that an optical path of the regular reflection light incident on the reading part 33 via the light guide member 32 is parallel to an optical path of the diffused light incident on the reading part 33 without via the light guide member 32, and the regular reflection light and the diffused light can be read by moving the reading part 33 or converging the light by an optical system such as a lens.

Further, in the present embodiment, the regular reflection light and the diffused light of the light emitted from one illumination part 31 are read. However, a plurality of illumination parts 31 may be provided, and the regular reflection light of light emitted from a first illumination part may be read while the diffused light of light emitted from a second illumination part may be read. In that case, wavelengths of light emitted from the plurality of illumination parts 31 may be the same, or the wavelengths may be different such that the first illumination part is for an infrared region while the second illumination part is for a visible region.

In this way, by using one reading part 33 to read the light regularly reflected by the inspection target 30 and the light diffused by the inspection target 30, it is possible to acquire the gloss distribution and the density distribution of the inspection target 30, and appropriately adjust image forming conditions.

In FIGS. 7 and 8, one reading part 33 is used to read the regular reflection light, or the regular reflection light and diffused light. However, as illustrated in FIG. 9, the reading part 33 may be formed by a first reading part 33a and a second reading part 33b, to read regular reflection light with the first reading part 33a to acquire a gloss distribution and read diffused light with the second reading part 33b to acquire a density distribution.

In this way, by separately providing the first reading part 33a to acquire the gloss distribution and the second reading part 33b to acquire the density distribution, it is not required to provide a mechanism to move the reading part 33, and the gloss distribution and the density distribution can be simultaneously acquired. In addition, since a sensor suitable for detecting regular reflection light or diffused light (for example, a sensor having a different detection wavelength or detection sensitivity) can be used, image forming conditions can be appropriately adjusted.

Figure 9:
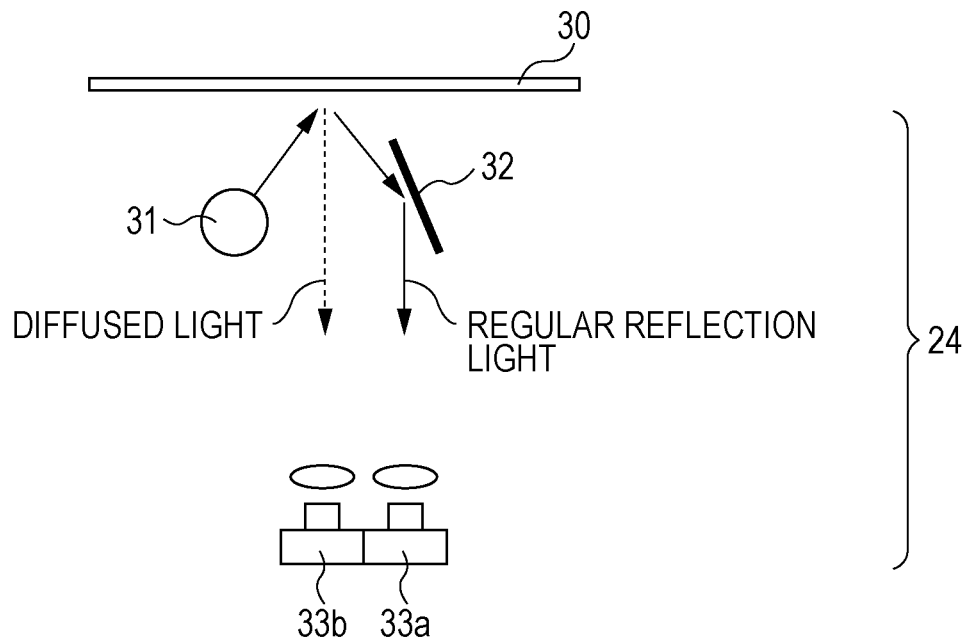
FIG. 9 is a schematic view illustrating another example of the structure of the image inspection part in the image forming apparatus according to one embodiment of the present invention (when a gloss distribution and a density distribution are read by different reading parts)
Figure 10:
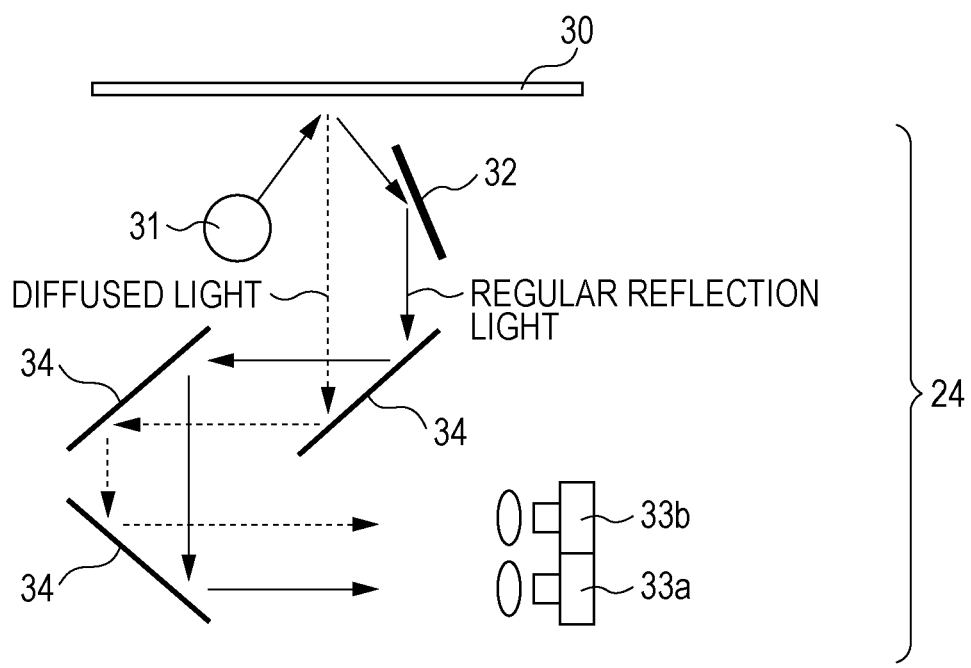
FIG. 10 is a schematic view illustrating another example of the structure of the image inspection part in the image forming apparatus according to one embodiment of the present invention (when regular reflection light and diffused light are reflected by a reflecting member)

In FIGS. 7 to 9, the light is reflected in the normal direction of the inspection target 30 by using the light guide member 32. However, there is a case where there is not enough space, in the normal direction of the inspection target 30, for arranging the reading parts 33 in which elements are arranged in the main scanning direction (width direction) of the sheet, or a case where external light intrudes from the normal direction of the inspection target 30 due to the structure of the apparatus. In this case, in the present embodiment, since the regular reflection light incident on the reading part 33 via the light guide member 32 is parallel to the diffused light incident on the reading part 33 without via the light guide member 32, as illustrated in FIG. 10, the regular reflection light and the diffused light can be reflected (reflected at least once in the sub scanning direction of the inspection target 30) by the reflecting member 34 such as a mirror. Here, the regular reflection light and the diffused light are reflected three times by the three reflecting members 34, but the number, a size, and a reflection angle of the reflecting member 34 are not limited to the configuration illustrated in the figure, and the light may be collected by forming the reflecting member 34 with a concave mirror or the like.

Thus reflecting both the regular reflection light and the diffused light enables changing of the installation location of the reading part 33, and allows the size of the entire image inspection part 24 to be compact. Note that, in FIG. 10, the reflecting member 34 is arranged for the configuration including the first reading part 33a and the second reading part 33b, but the reflecting member 34 may also be arranged for the configuration including one reading part 33.

Figure 11:
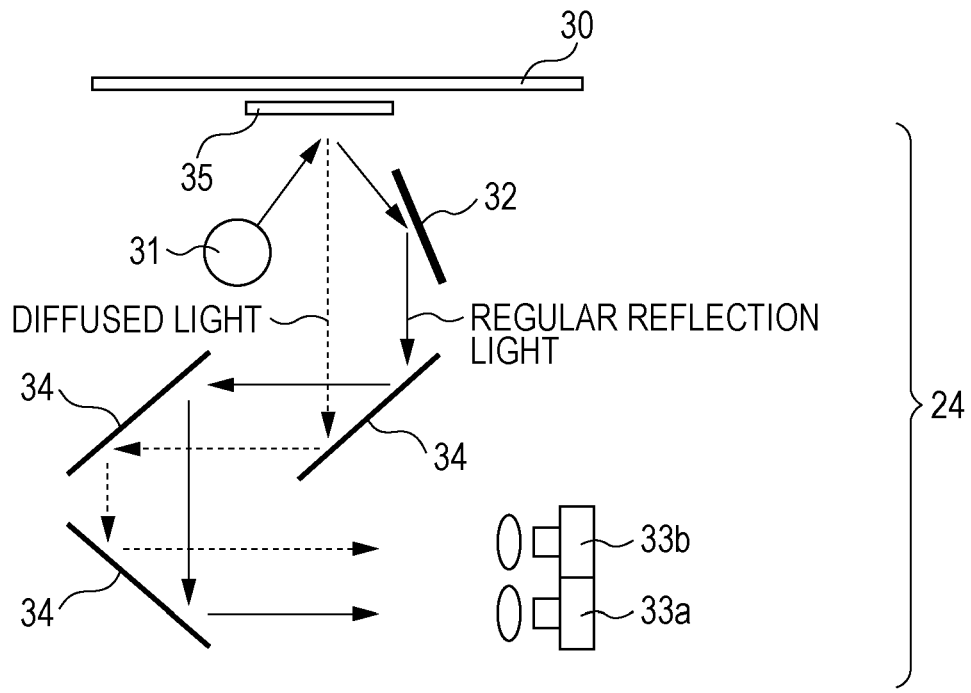
FIG. 11 is a schematic view illustrating another example of the structure of the image inspection part in the image forming apparatus according to one embodiment of the present invention (when a light-transmitting member is arranged between an inspection target and a light guide member)

In FIGS. 7 to 10, the image inspection part 24 is formed by the illumination part 31, the light guide member 32, the reading part 33 (the first reading part 33a and the second reading part 33b), and as necessary, the reflecting member 34. However, when a sheet is conveyed, contaminants such as toner and fibers may adhere to the light guide member 32, the reading part 33, and the like, to deteriorate accuracy of reading of the regular reflection light and the diffused light. In such a case, as illustrated in FIG. 11, a light-transmitting member 35 made of glass or the like is arranged between the inspection target 30, and the illumination part 31 and the light guide member 32 (for example, at a distance of about 1 mm from the inspection target 30). It suffices that the light-transmitting member 35 can transmit the light emitted from the illumination part 31, and a material, a size, a thickness, and the like can be appropriately set. In addition, any method of installing the light-transmitting member 35 may be adopted, and for example, the light-transmitting member 35 can be fixed to a guide plate (not illustrated) that forms a sheet conveyance path.

Thus arranging the light-transmitting member 35 enables the image inspection part 24 to be dustproof. Note that, in FIG. 11, the light-transmitting member 35 is disposed for the configuration of FIG. 10, but the light-transmitting member 35 may be disposed for the configuration of FIGS. 7 to 9.

Figure 12:
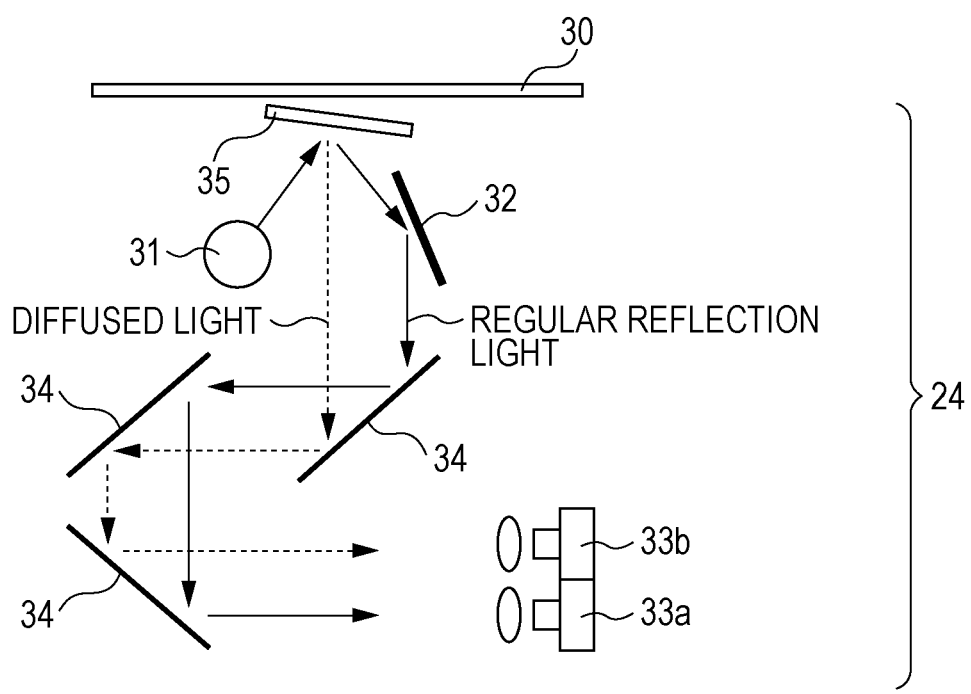
FIG. 12 is a schematic view illustrating another example of the structure of the image inspection part in the image forming apparatus according to one embodiment of the present invention (when the light-transmitting member is arranged to be inclined)

In FIG. 11, the light-transmitting member 35 is installed in parallel with the inspection target 30. However, when the light-transmitting member 35 is disposed in parallel with the inspection target 30, light incident on the light-transmitting member 35 from the illumination part 31 may be totally reflected on a surface of the light-transmitting member 35 and no longer be incident on the inspection target 30, or light incident on the light-transmitting member 35 (directly incident from the illumination part 31 or reflected on the inspection target 30 to be incident) may be multiply reflected inside the light-transmitting member 35. In such a case, as illustrated in FIG. 12, the light-transmitting member 35 can be arranged to be inclined so as not to be parallel to the inspection target 30. Note that an angle of the inclination of the light-transmitting member 35 can be appropriately set in accordance with a positional relationship (regular reflection angle) between the inspection target 30, the illumination part 31, and the light guide member 32, and can be set to, for example, about 10°.

Thus inclining the light-transmitting member 35 can suppress an effect of total reflection by the light-transmitting member 35, and allows the light-transmitting member 35 for dust prevention to be arranged even in the image inspection part 24 that reads regular reflection light.

Figure 13A:
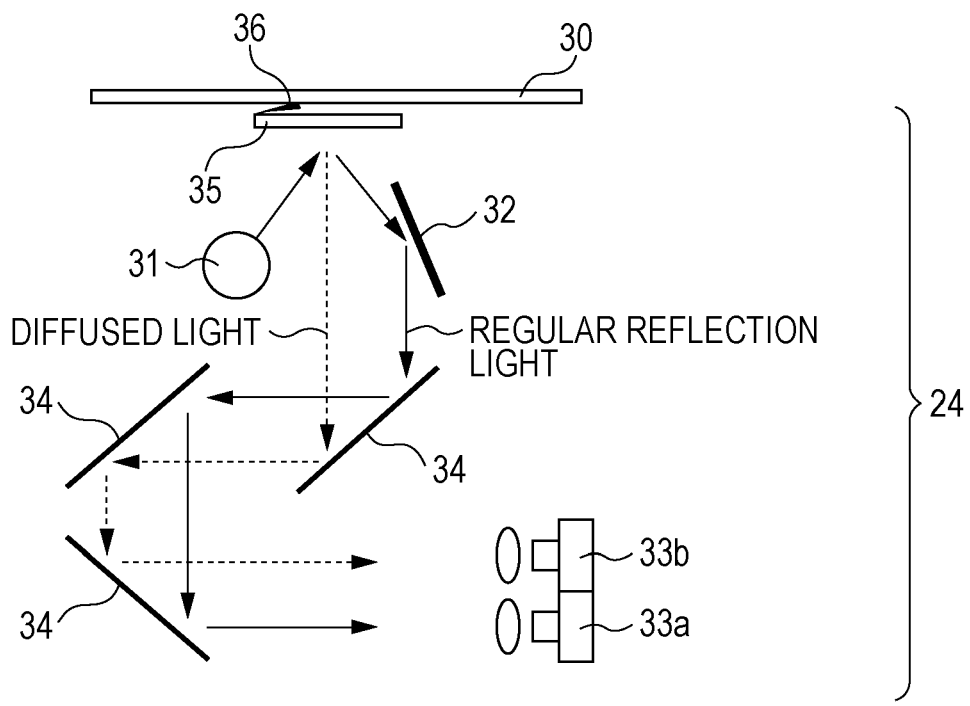
FIGS. 13A and 13B are schematic views illustrating another example of the structure of the image inspection part in the image forming apparatus according to one embodiment of the present invention (when a position maintaining member is installed on the light-transmitting member)

The inspection target 30 is conveyed by the conveyance roller provided in the sheet conveyance path. However, when a position of the inspection target 30 fluctuates on the sheet conveyance path, such as when the inspection target 30 sinks between the conveyance rollers, an incident angle of the light incident on the inspection target 30 from the illumination part 31 changes, which may disable accurate detection of the regular reflection light, or may cause the inspection target 30 to come into contact with the light-transmitting member 35 and stain the light-transmitting member 35. In such a case, as illustrated in FIG. 13A, a position maintaining member 36 that maintains a position of the inspection target 30 can be arranged near the conveyance path of the inspection target 30. It suffices that the position maintaining member 36 can maintain the position of the inspection target 30, and may be made by, for example, polyethyleneterephthalate (PET), and can be installed on the inspection target 30 side of the light-transmitting member 35 as illustrated in FIG. 13B.

Thus providing the position maintaining member 36 enables suppression of fluctuation in the position of the inspection target 30 on the sheet conveyance path, and prevention of stain on the light-transmitting member 35. In FIGS. 13A and 13B, the position maintaining member 36 is arranged in the configuration of FIG. 11, but the position maintaining member 36 may be arranged in the configurations of FIGS. 7 to 10.

Figure 13B:
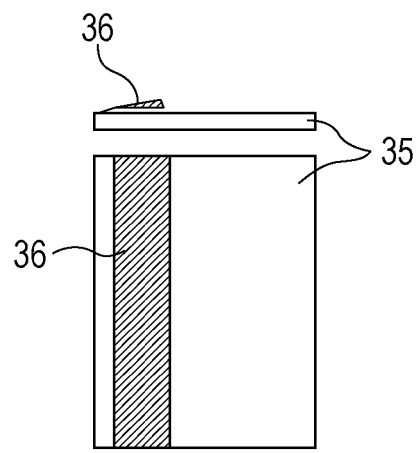
Figure 14:
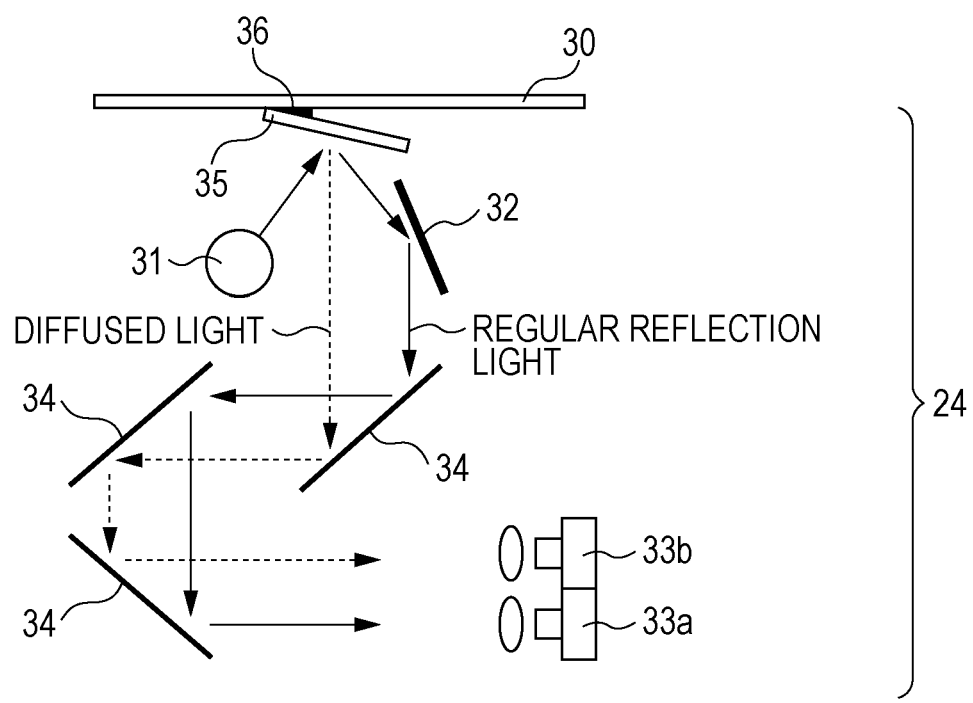
FIG. 14 is a schematic view illustrating another example of the structure of the image inspection part in the image forming apparatus according to one embodiment of the present invention (when the light-transmitting member installed with the position maintaining member is arranged to be inclined)

In FIGS. 13A and 13B, the position maintaining member 36 is installed on the light-transmitting member 35 arranged in parallel with the inspection target 30, but the position maintaining member 36 may be installed to the light-transmitting member 35 arranged to be inclined with respect to the inspection target 30, as illustrated in FIG. 14. In this case, the light-transmitting member 35 may be inclined in any direction with respect to the inspection target 30. However, the position maintaining member 36 is to be disposed at a portion where a distance between the inspection target 30 and the light-transmitting member 35 is small, and the position of the inspection target 30 can be reliably maintained when the position maintaining member 36 is arranged on an upstream side of the inspection target 30. Therefore, the light-transmitting member 35 is desirably inclined so as to narrow the distance on the upstream side of the inspection target 30.

Thus installing the position maintaining member 36 on the light-transmitting member 35 arranged to be inclined enables maintenance of the position of the inspection target 30, and suppression of an effect of total reflection by the light-transmitting member 35.

In FIGS. 7 to 14, the image inspection part 24 is arranged on one side (a lower side in the figure) of the inspection target 30. However, when the print processing part 23 can form images on both sides of the sheet, and inspection is performed on both sides of the sheet, as illustrated in FIG. 15, a first image inspection part 24a may be arranged on one side of the inspection target 30, and a second image inspection part 24b may arranged on the other side.

Thus arranging the image inspection parts 24 on both sides of the inspection target 30 enables simultaneous inspection of both sides of the inspection target 30, and reduction of an inspection time. Although the image inspection parts 24 having the configuration of FIG. 12 are arranged on both sides of the inspection target 30 in FIG. 15, the image inspection parts 24 having the configurations of FIGS. 7 to 11 may be arranged on both sides of the inspection target 30.

Figure 15:
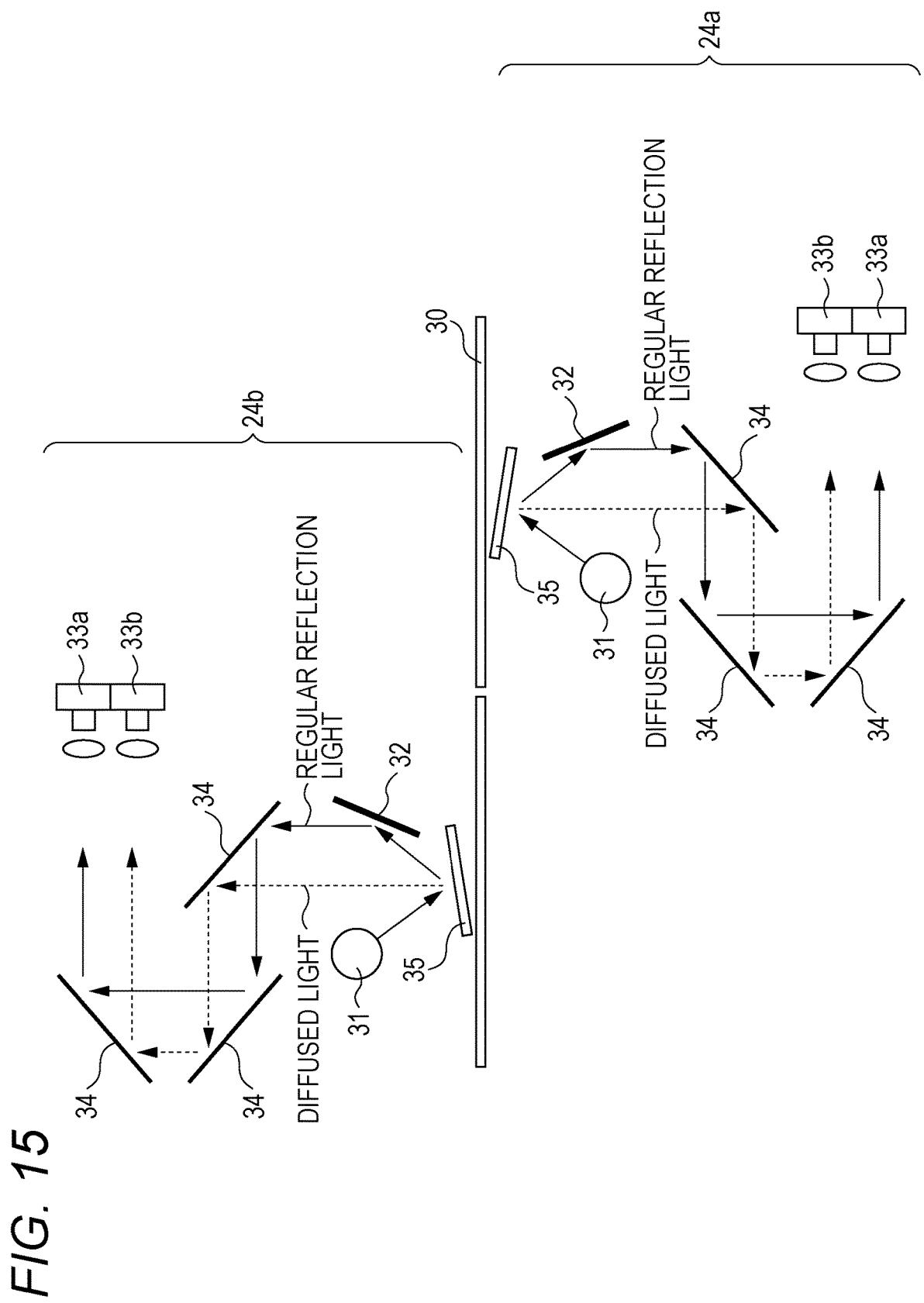
FIG. 15 is a schematic view illustrating another example of the structure of the image inspection part in the image forming apparatus according to one embodiment of the present invention (when the image inspection parts provided with the light-transmitting member are arranged on both sides of the inspection target)
Figure 16:
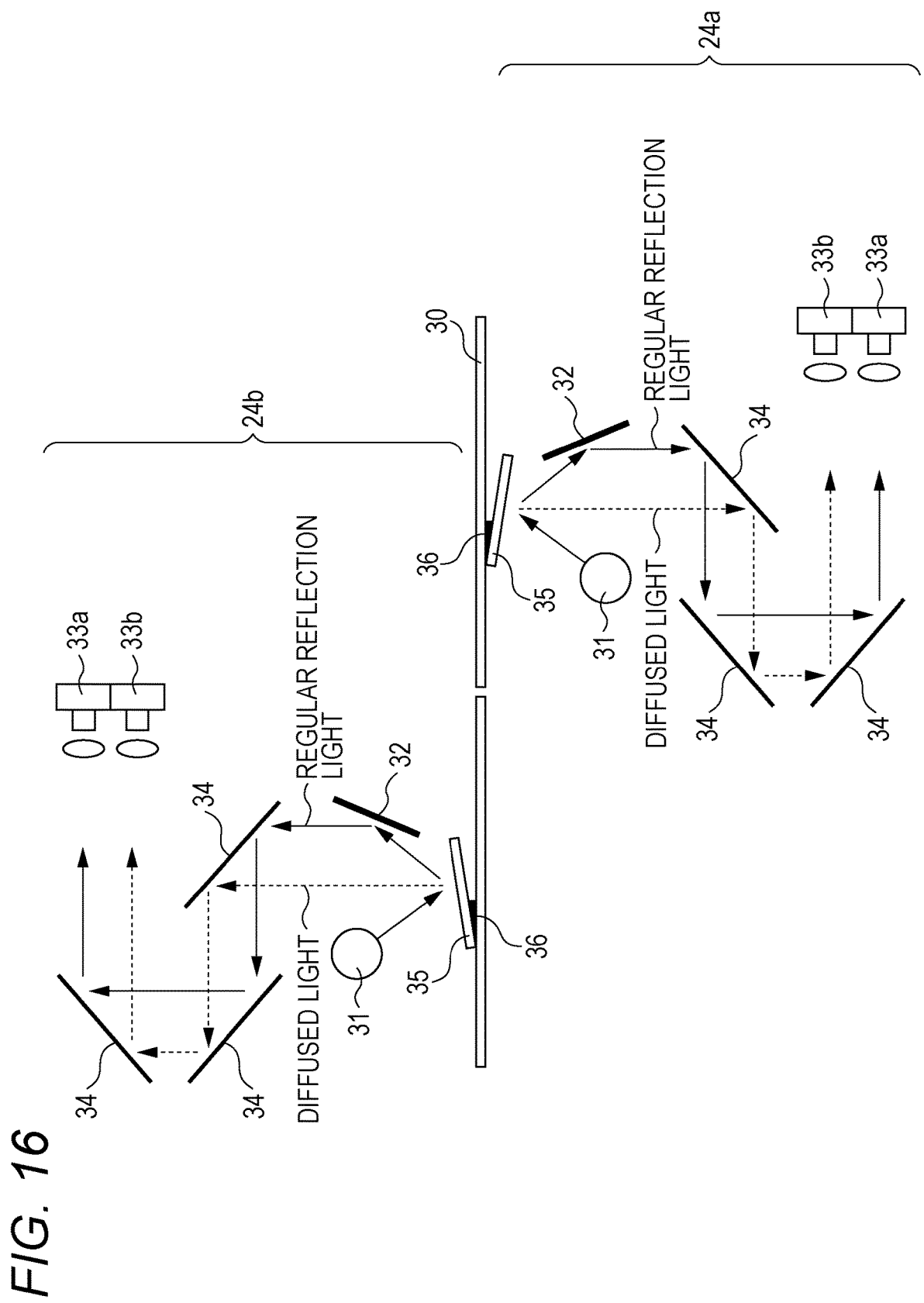
FIG. 16 is a schematic view illustrating another example of the structure of the image inspection part in the image forming apparatus according to one embodiment of the present invention (when the image inspection parts provided with the light-transmitting member and the position maintaining member are arranged on both sides of the inspection target.

Further, in FIG. 15, the image inspection part 24 including the illumination part 31, the light guide member 32, the reading part 33, the reflecting member 34, and the light-transmitting member 35 is arranged on both sides of the inspection target 30. However, as illustrated in FIG. 16, the image inspection part 24 including the position maintaining member 36 may be arranged on both sides of the inspection target 30. In this configuration, the inspection target 30 is held by the position maintaining member 36 arranged on both sides. Therefore, the position of the inspection target 30 can be held more reliably, and accuracy of reading regular reflection light can be improved.

As described above, by returning the light regularly reflected by the inspection target 30 in a direction other than the main scanning direction (in the normal direction, the sub scanning direction, or the like) of the inspection target 30 by using the light guide member 32 such as a mirror, the image inspection part 24 can be downsized to be mounted to the image forming apparatus 12. Then, using the image forming apparatus 12 mounted with the image inspection part 24 enables appropriate feedback of an image inspection result to the image process, to maintain favorable image quality.

Note that the present invention is not limited to the above embodiment, and the configuration and control of the image forming apparatus 12 can be appropriately changed without departing from the spirit of the present invention.

For example, in the above embodiment, the image forming apparatus 12 mounted with the image inspection part 24 has been described, but the present invention is similarly applied to a case where an image inspection apparatus 13 different from the image forming apparatus 12 is used.

The present invention is applicable to an image inspection apparatus for inspecting a characteristic of a sheet, and an image forming apparatus mounted with the image inspection apparatus.

Although embodiments of the present invention have been described and illustrated in detail, the disclosed embodiments are made for purposes of illustration and example only and not limitation. The scope of the present invention should be interpreted by terms of the appended claims.

What is claimed is:

1. An image inspection apparatus comprising:
    an illumination part that emits light on an inspection target;
    a reading part that is arranged with, in one or more dimensions, elements that detect light reflected by the inspection target, the reading part reading an entire width of the inspection target; and
    a hardware processor that inspects a characteristic of the inspection target based on a reading result of the reading part, wherein
    a light guide member is provided at a position where light regularly reflected by the inspection target passes,
    the light guide member is arranged to allow an optical path of light incident on the reading part via the light guide member to be parallel to an optical path of light incident on the reading part without via the light guide member, and
    the hardware processor inspects a gloss distribution of the inspection target based on a reading result of light incident on the reading part via the light guide member, and inspects a density distribution of the inspection target based on a reading result of light incident on the reading part without via the light guide member.

2. The image inspection apparatus according to claim 1, wherein
    the light guide member is a mirror.

3. The image inspection apparatus according to claim 1, wherein the reading part includes a first reading part that reads light incident via the light guide member, and a second reading part that reads light incident without via the light guide member.

4. The image inspection apparatus according to claim 1, further comprising:
a reflecting member that reflects light incident on the reading part via the light guide member and light incident on the reading part without via the light guide member, at least once in a sub scanning direction of the inspection target.

5. The image inspection apparatus according to claim 1, further comprising:
a light-transmitting member between the inspection target, and the illumination part and the light guide member.

6. The image inspection apparatus according to claim 5, wherein
the light-transmitting member is arranged to be inclined with respect to the inspection target.

7. The image inspection apparatus according to claim 5, further comprising:
a position maintaining member that maintains a position of the inspection target, wherein the position maintaining member is installed on the inspection target side of the light-transmitting member.

8. The image inspection apparatus according to claim 7, wherein
the position maintaining member is installed on an upstream side of the inspection target, on the light-transmitting member.

9. The image inspection apparatus according to claim 1, wherein
an image inspection part including the illumination part, the light guide member, and the reading part is installed on both sides of the inspection target.

10. The image inspection apparatus according to claim 1, wherein
the reading part is a two-dimensional array sensor.

11. An image forming apparatus comprising:
the image inspection apparatus according to claim 1 and an image forming part, wherein
the hardware processor adjusts an image forming condition of the image forming part in accordance with a characteristic of the inspection target.

* * * * *